Figure 5:
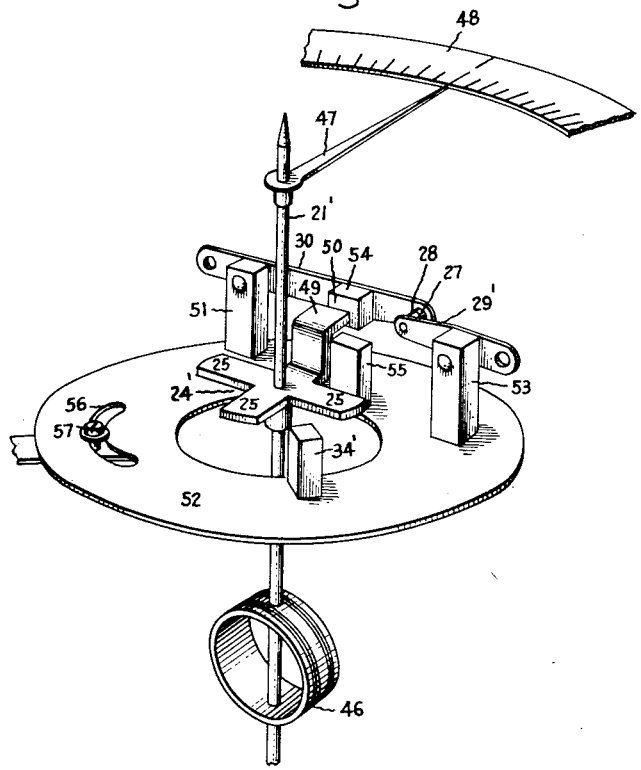

Jan. 6, 1942.                H. A. BAKKE                 2,269,242
                      MAGNETIC CONTACT DEVICE
                      Filed Nov. 5, 1940            2 Sheets-Sheet 1
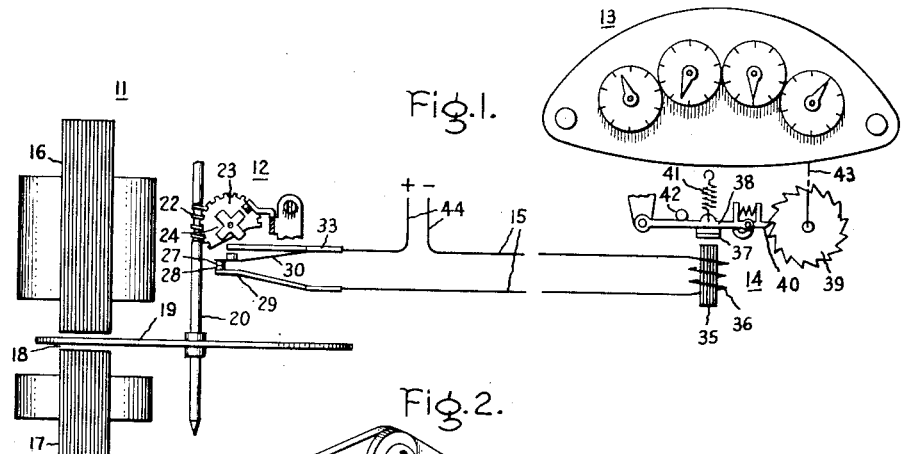
Fig. 1.
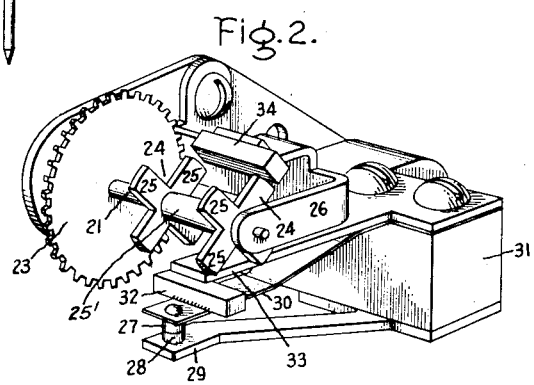
Fig. 2.
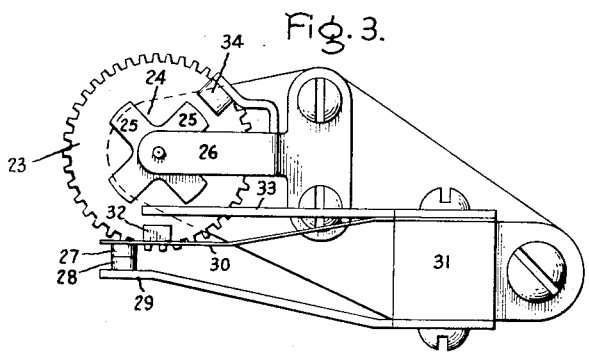
Fig. 3.
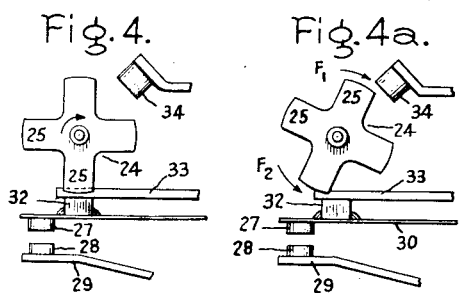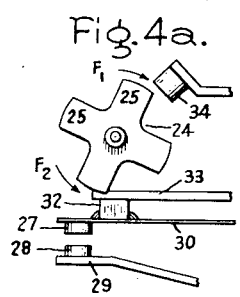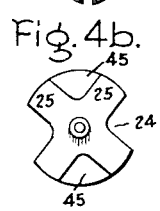
Fig. 4.   Fig. 4a.   Fig. 4b.
Inventor:
Hans A. Bakke,
by Harry E. Dunham
His Attorney.

Patented Jan. 6, 1942

2,269,242

UNITED STATES PATENT OFFICE 2,269,242

MAGNETIC CONTACT DEVICE

Hans A. Bakke, Swampscott, Mass., assignor to General Electric Company, a corporation of New York Application November 5, 1940, Serial No. 364,379

5 Claims. (Cl. 200—19)

My invention relates to contact devices operable by rotating or pivoting members, and concerns particularly contact devices for operation by watthour meters.

It is an object of my invention to provide an extremely low friction yet positively acting contact device which is suitable for operation by a member rotating always in the same direction or by a member which may rotate back and forth around a pivot and which produces contact operation whenever the operating member reaches a given operating position. More specific objects of my invention are the provision of means whereby a watthour meter may be made to open and close an electrical contact in order to produce electrical impulses at a rate proportional to the wattage of the electrical system without placing any drag upon the watthour meter.

Another object of my invention is to fit a sensitive, low-torque electrical indicating instrument with means for opening or closing an electrical contact at a given angular position of the instrument pointer without impairing the accuracy of the instrument by imposing any deleterious torque thereon.

Still another object is to provide an instrument contact-making arrangement with means for adjusting the point at which the contact operation is produced. Other and further objects and advantages will become apparent as the description proceeds.

In carrying out my invention in its preferred form, in connection with watthour meters, I provide a rotatable shaft driven by the watthour meter spindle and carrying a magnetically permeable armature with projecting arms and I provide a permanent magnet attached to a pivoted or resilient member carrying a switch contact. The magnet-carrying member is so mounted in relation to the armature-carrying shaft that whenever a projecting arm of the armature comes in proximity to the magnet it attracts the magnet to open or close the contact, according to the arrangement, and whenever the armature arm rotates out of the magnet field of the magnet the movable contact is released. In order to make the mechanism quite free from friction I may provide also a balancing magnet which applies magnetic attraction to the armature arms to exert a torque opposing the torque component of the attractive force of the contact operating magnet. In this manner the arms of the armature are subjected to substantially equal attraction by the two magnets so that there is no tendency in any position of the operating shaft to urge it forward or retard its motion.

A better understanding of my invention will be afforded by the following detailed description considered in connection with the accompanying drawings, and those features which are believed to be novel and patentable will be pointed out in the claims appended hereto. In the drawings, Fig. 1 is a schematic diagram of one embodiment of my invention forming a system in which a remote dial or register may be operated by a watthour meter. Fig. 2 is a perspective view of a contact-making mechanism driven by the watthour meter spindle of the system of Fig. 1; Fig. 3 is an elevation of the mechanism of Fig. 2; Fig. 4 is a fragmentary view showing a portion of the mechanism of Figs. 2 and 3 in another position; Fig. 4a is a view corresponding to Fig. 4 with the armature in still another position; Fig. 4b is a view of the mechanism with means for changing the impulse rate; and Fig. 5 is a perspective view schematically representing another embodiment of my invention forming a contact-making mechanism for an indicating instrument. Like reference characters are utilized throughout the drawings to designate like parts.

In Fig. 1 I have shown by way of illustration a system consisting of a watthour meter 11, a contact-making mechanism 12 and a remote dial or register 13 operated by a ratchet mechanism 14, energized by electrical impulses transmitted through a pair of conductors 15 in response to operation of the contact-making mechanism 12.

The watthour meter 11 may be of any standard type comprising a voltage field 16, a current field 17, and an air gap 18 therebetween for receiving an eddy current disk 19 carried by a rotatable spindle 20. As is well known, the field members 16 and 17 produce a shifting magnetic field acting upon the disk 19, driving it at a speed proportional to the power of an electrical circuit to which the windings of the field members 16 and 17 are connected. Such watthour meters customarily carry a register, not shown, usually driven through a worm gear. The arrangement shown by way of illustration is one in which the contact device 12 has been added to the watthour meter to enable it to operate also the register 13 which may be placed a considerable distance from the location of the watthour meter.

The contact device 12 has a rotatable operating shaft 21 (Fig. 2) which is driven by the spindle 20 of the watthour meter 11. The operating shaft 21 and the spindle 20 may be coupled by means of a conventional worm gear of the type used for directly driving watthour meter register, consisting of conical threads 22 cut into the spindle 20, and a gear 23 cooperating therewith, and secured to the operating shaft 21 of the magnetic contact device. In the arrangement shown in Figs. 1 to 4 inclusive, the contact-device operating shaft 21 carries a pair of armatures 24 having projecting arms 25. For example, the armatures 24 may be in the form of X's or crosses having four perpendicular arms of equal length. The armatures 24 are so mounted that the corresponding arms 25 are parallel. Preferably the armatures 24 are joined by a bar or a sleeve 25 composed of magnetizable material. Suitable structure such as a bracket 26 is provided for supporting the operating shaft 21 and the construction is such that the shaft 21 is freely rotatable.

The switch or contacting element consists of a pair of contact buttons 27 and 28, the latter of which is carried by a stiff stationary strip 29, and the former of which is carried by a movable member such as a pivoted arm or a resilient strip 30. The plates 29 and 30 are secured to a suitable insulating block 31.

The resilient strip 30 has secured to it by means of welding, soldering or other suitable fastening means a permanent magnet 32 which extends transversely with respect to the strip 30, and the strip 30 is so mounted that the magnet 32 is parallel to the contact-mechanism-operating shaft 21 and is in proximity to the armatures 24. The armatures 24 are axially spaced a distance approximately equal to the length of the permanent magnet 32, and preferably a stop 33 is provided which prevents the magnet 32 from making actual contact with the tips of the arms 25 of the armatures 24, even when the tips are rotated to the position of greatest proximity to the permanent magnet 32.

Preferably the armatures 24 are composed of relatively high permeability magnetic material, such as soft iron or an alloy composed of nickel and iron, for example 78½% nickel and the balance iron. The permanent magnet 32 is preferably composed of a high coercive force permanent magnet material in order to retain its strength and for adequate drawing power with light weight. For this purpose an alloy of iron, aluminum nickel and cobalt as described in Patent 1,968,569 Ruder has been found suitable.

In order to prevent introduction of any frictional effect by the permanent magnet 32, and leave the shaft 21 freely rotatable without any drag on the watthour meter spindle 20, a neutralizing or balancing magnet 34 may be provided. The magnet 34 is so mounted that the magnetic attraction between it and the arms 25 of the armatures 24 equals and opposes the attraction between the magnet 32 and the armature arms. The magnet 34 may be of the same size and composition as the magnet 32. In the arrangement shown it is parallel to the magnet 32, the same radial distance from the shaft 21 and angularly spaced 135 degrees from the magnet 32. However, it could be spaced any odd multiple of 45 degrees from the magnet 32, since the arms 25 of the armatures 24 are 90 degrees apart.

The ratchet mechanism 14 for operating the remote dial 13 is not a part of my invention and it may have any suitable construction already known to those skilled in the art. It may consist, for example, of an electromagnet 35 having a winding 36 and cooperating with it an armature 37 carried by a pivoted ratchet arm 38, cooperating with the ratchet wheel 39 by means of a ratchet 40 pivotally mounted and resiliently biased at the end of the ratchet arm 38. The ratchet arm 38 is provided also with a biasing spring 41 holding it against the stop 42, away from the electromagnet 35. The ratchet wheel 39 is connected by suitable means, such as a shaft 43 to the driving shaft of the register or dial 13. For energizing the winding 36 of the electromagnet 35 a current source 44 may be provided connected in series with the contacts 27 and 28 and winding 36.

When the windings of the watthour meter 11 are energized, its spindle 20 is rotated at a speed representing the power on the circuit to which the watthour meter is connected. This rotation is communicated to the switch-operating rotatable shaft 21 and the arms 25 of the armatures 34 rotate past the polar or end portions of the permanent magnets 32 and 34 at a speed proportional to the power of the circuit to which the watthour meter 11 is connected. Accordingly, the contacts 27 and 28 are opened and closed at a speed proportional to the power; and electrical impulses, having a frequency proportional to power are transmitted to the ratchet operating winding 36. The dial-driving shaft 43 accordingly rotates at a speed proportional to the power, and the number of revolutions thereof indicates the total energy measured by the watthour meter, just as would be the case if the dial 13 were driven directly from the watthour meter spindle.

When the switch operating shaft 21 and the armatures 35 are in the position shown in Figs. 1, 2 and 3, the tips of the projections 25 are too far away from the magnet 32 for it to attract itself to the soft iron armatures. Accordingly, the spring support 30 holds the magnet 32 away from the armatures 24 and the contacts 27 and 28 remain closed. It will be understood, however, that my invention is not limited to an arrangement in which the contacts 27 and 28 are closed in this position of the permanent magnet and my invention does not exclude the alternative of having the stationary contact 28 above the resilient plate 30 and the movable contact 27 on the top surface of the plate 30 more as in Fig. 5 instead of having the arrangement shown in Figs. 1–4. When the armatures rotate to the position shown in Fig. 4, the tips of the projections 25 come so close to the pole portions of the premanent magnet 32 that the magnet 32 lifts itself toward the armature, thus opening the contacts 27 and 28.

When a projection 25 rotates beyond the permanent magnet 32 there is an attractive force F2 between the projection 25 and the magnet 32 which would tend to retard the rotation of the armature 24. However, when this position of the armature 24 is approached another one of the projections 25 comes within the magnet field of the neutralizing magnet 34 as in Fig. 4a and an attractive force F1 is set up between the magnet 34 and the projection 25 which would tend to urge the armature 24 to rotate further forward, if the magnet 32 were not acting. With both magnets 32 and 34 acting the effects of the magnetic attractive force on the rotary motion are canceled and the contact device operates without producing any retarding torque or drag on the watthour meter 20. Similar neutralization takes place for any other position of the armature 24 intermediate between the position shown in Fig. 4 and the position shown in Figs.

1, 2 and 3. In the position of Fig. 4 or the position of Figs. 1, 2 and 3 neither of the permanent magnets 32 or 34 tends to produce any rotation. In these two positions the permanent magnets either are too great a distance from adjacent projecting arms 25 to exert substantially attractive force or the attractive force acts radially and does not tend to rotate the armature in either direction.

It will be apparent that when an armature is employed having four projections, four opening and closing operations of the contacts 27 and 28 will be produced for each revolution of the shaft 21, and the electric impulse rate is four times the speed of rotation of the shaft 21. Any desired ratio between electric impulse rate and the speed of rotation of the shaft 21 may be obtained by selecting armatures with suitable numbers of projecting arms. Likewise, the impulse rate may be reduced by reducing the number of arms, for example by clipping soft iron magnetic shunts between some of the projecting arms, such as shown at 45 in Fig. 4b, for example.

The relationship between the number of impulses produced by revolution of the contact-operating shaft and the number of projecting arms of the armature may be varied also by bending one or more of the projecting arms out of the plane of the remaining projecting arms, as illustrated in Fig. 5. In Fig. 5 the arrangement is such that the contact-operating arm 21' has only one angular position in which contact operation is produced. In this case, the contacts are closed when the contact operating shaft 21' is in a predetermined position. The modification of Fig. 5 is shown as applied to a deflecting electrical indicating instrument, which may be a long angular scale instrument, but is shown as having a conventional deflecting element with a conventional rotatable coil 46 adapted to cooperate with a field structure, not shown. The instrument spindle serving also as the contact-operating shaft 21' carries the coil 46 and a deflecting pointer 47 cooperating with a conventional graduated scale 48. The armature 24' is in this case secured directly to the instrument spindle instead of being connected through gearing to an instrument or meter spindle, as in Fig. 1.

The armature 24' has three flat projections 25, as in the embodiment of Figs. 1 to 4 inclusive, and has also an additional projection 49 which is bent with two right angle bends to leave a projecting tip 50 in a different plane from the projections 25. The resilient strip 30 is secured to an insulating post 51 carried by a plate 52, which carries also an insulating post 53 to which stiff strip 29' carrying the stationary contact 28 is secured. In this case only one armature 24' is employed and a short block magnet 54 is secured to the resilient strip 30 carrying the movable contact 27. The position of the strip 30 is such that the armature projection 49 comes within the field of the magnet 54 when the spindle 21' rotates the projection 49, but the other projections 25 do not come within the field of the movable magnet 54. Accordingly, there is only one angular position of the instrument pointer 47 and spindle 21' in which the magnet 54 exerts attractive force causing the contacts 27 and 28 to be closed.

In the modification of Fig. 5, as in the embodiment of Figs. 1 to 4, a neutralizing magnet 34' is employed which cooperates with the projecting arms 25 to prevent either the magnet 54 or 34' from introducing any torque effect. An additional neutralizing magnet 55 may be provided for neutralizing the attraction between the neutralizing magnet 34' and the arms 25 when the spindle 21' is rotated so far that the armature projection 49 is out of the quadrant occupied by movable magnet 54 and one of the other projections 25 comes within that quadrant. The auxiliary neutralizing magnet 55 is mounted at such a height that projections 25 come within its magnetic field when the spindle 21' is rotated sufficiently far.

The switch-mechanism-supporting plate 52 may be so mounted as to be adjustable in angular position by means of an arcuate slot 56 and a clamping screw 57 in order to permit varying the scale point of the instrument at which contact operation is produced.

I have herein shown and particularly described certain embodiments of my invention and certain methods of operation embraced therein for the purpose of explaining its principle and showing its application, but it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States, is:

1. A contact-making device comprising a rotatable shaft carrying a pair of axially spaced cross-shaped armatures of permeable magnetic material having arms of equal length and a switch consisting of a stationary contact and a movable contact secured to a permanent magnet, the switch being so positioned in relation to the rotatable shaft that the projecting arms of the armatures come within the magnetic field of the permanent magnet as the shaft is rotated in order to cause the magnet to be attracted and to be released alternately as the armature projections pass the magnet to cause the contact to be opened or closed according to the angular position of the rotatable shaft.

2. A contact-making device of the type set forth in claim 1 characterized by the addition of a neutralizing magnet mounted in such an angular position in relation to the movable permanent magnet as to balance the component of attractive force of the permanent magnet tending to exert torque on the rotatable armatures.

3. A contact-making device comprising a rotatable armature with a portion projecting transversely from the axis of rotation, a stationary contact, a movable contact, and a permanent magnet secured to the movable contact, the axis of rotation of the armature and the movable contact being so positioned in relation to each other that in a given angular position of the armature it comes within the magnetic field of the permanent magnet setting up an attractive force therebetween and causing movement of the permanent magnet, together with movement of the movable contact, said movable contact having means for biasing it to an opposite position when the armature is rotated out of the magnetic field of the permanent magnet.

4. A contact-making device of the type set forth in claim 3 characterized by the addition of a neutralizing magnet angularly spaced from the movable permanent magnet and in such an angular position with respect thereto that the rotary component of its attractive force upon the armature opposes the rotary component of the attractive force of the permanent magnet when the armature is away from the position in which the attractive force between it and the movable magnet is radial.

5. A contact-making instrument having a rotatable spindle carrying an armature with a plurality of projections, at least one of said projections being in a different plane from the remaining projections, a switch with a movable contact member, a permanent magnet secured to said movable contact member and so positioned with respect to the instrument spindle that in a given angular position thereof one of said armature projections comes within the magnetic field of said permanent magnet to set up an attractive force and produce motion of the switch member to one of two alternative positions, and a neutralizing magnet so positioned that other armature projections come within its magnetic field at predetermined angular positions of the instrument spindle, the angular position of the neutralizing magnet with respect to the first magnet being such that the rotational components of attractive force between the respective magnets and the armature projections act in opposite direction.

HANS A. BAKKE.